(12) United States Patent
Ichinose

(10) Patent No.: US 6,429,169 B1
(45) Date of Patent: Aug. 6, 2002

(54) PHOTOCATALYTIC BODY AND METHOD FOR MAKING SAME

(75) Inventor: Hiromichi Ichinose, Ariake-machi (JP)

(73) Assignee: Saga-Ken, Saga (JP)

( * ) Notice: Subject to any disclaimer, the term of this patent is extended or adjusted under 35 U.S.C. 154(b) by 0 days.

(21) Appl. No.: 09/517,315

(22) Filed: Mar. 2, 2000

Related U.S. Application Data

(63) Continuation of application No. 08/952,983, filed as application No. PCT/JP97/00767 on Mar. 12, 1997, now Pat. No. 6,107,241.

(30) Foreign Application Priority Data

Mar. 29, 1996 (JP) ................................. 8-75543

(51) Int. Cl.$^7$ .......................... B01J 23/00; C04B 35/46; C01G 25/02; C01G 23/047
(52) U.S. Cl. ...................... 502/350; 502/349; 501/134; 423/608; 423/610
(58) Field of Search ................................ 502/349, 350; 423/608, 610; 501/134; 252/186.28; 516/90

(56) References Cited

U.S. PATENT DOCUMENTS

| | | | | |
|---|---|---|---|---|
| 3,975,197 A | | 8/1976 | Mikelsons | |
| 4,178,270 A | * | 12/1979 | Fujita et al. | 252/447 |
| 4,349,456 A | * | 9/1982 | Sowman | 252/317 |
| 4,537,865 A | * | 8/1985 | Okabe et al. | 501/135 |
| 4,756,999 A | | 7/1988 | Swain et al. | |
| 4,820,669 A | * | 4/1989 | Kato et al. | 501/134 |
| 4,918,138 A | | 4/1990 | Hara et al. | |
| 5,173,215 A | | 12/1992 | Clarke | |
| 5,281,496 A | | 1/1994 | Clarke | |
| 5,360,833 A | | 11/1994 | Eckberg et al. | |
| 5,403,513 A | * | 4/1995 | Sato et al. | 252/309 |
| 5,462,674 A | | 10/1995 | Butters et al. | |
| 5,565,025 A | * | 10/1996 | Schraml-Marth | 106/417 |
| 5,589,078 A | | 12/1996 | Butters et al. | |
| 5,604,339 A | | 2/1997 | Tabatabaie-Raissi | |
| 5,616,532 A | | 4/1997 | Heller et al. | |
| 5,658,841 A | | 8/1997 | Tanake et al. | |
| 5,668,076 A | | 9/1997 | Yamagushi et al. | |
| 5,700,451 A | * | 12/1997 | Yue et al. | 424/59 |
| 5,853,866 A | * | 12/1998 | Watanabe et al. | 428/312.8 |
| 5,872,072 A | | 2/1999 | Mouri et al. | |

FOREIGN PATENT DOCUMENTS

| | | | |
|---|---|---|---|
| JP | 62-283817 | | 12/1987 |
| JP | 63017221 A | * | 1/1988 |
| JP | 4-284851 | | 10/1992 |
| JP | 4-334552 | | 11/1992 |
| JP | 5-309267 | | 11/1993 |
| JP | 6-205977 | | 7/1994 |
| JP | 6-246165 | | 9/1994 |
| JP | 7-171408 | | 7/1995 |
| JP | 8-229549 | | 9/1996 |
| JP | 8-257399 | | 10/1996 |
| JP | 9-71418 | | 3/1997 |

* cited by examiner

Primary Examiner—Steven P. Griffin
Assistant Examiner—Cam N. Nguyen
(74) Attorney, Agent, or Firm—Smith, Gambrell & Russell, LLP

(57) ABSTRACT

An amorphous titanium peroxide sol made by a process which includes adding an alkali hydroxide to an aqueous titanium salt solution and reacting the resulting amorphous titanium hydroxide with an aqueous hydrogen peroxide solution to obtain an amorphous titanium peroxide sol. The amorphous titanium peroxide sol is afterward raised to a temperature sufficient to obtain an anatase titanium oxide sol. The resulting anatase titanium oxide sol can thereafter be heated to a temperature sufficient to obtain anatase titanium oxide. The claimed compositions are useful as binders to support the particles of a photocatalyst on a variety of substrates.

1 Claim, No Drawings

PHOTOCATALYTIC BODY AND METHOD FOR MAKING SAME

This application continuation of U.S. application Ser. No. 08/952,983 filed Nov. 25, 1997, U.S. Pat. No. 6,107,241 issued Aug. 22, 2000, which is a 371 of PCT/JP97/00767 filed Mar. 12, 1997.

TECHNICAL FIELD

This invention relates to a photocatalytic body having a good photocatalytic function, a method for making the same, and a photocatalytic composition used therefor.

BACKGROUND TECHNOLOGY

When semiconductors are irradiated with light whose wavelength has an energy greater than a band gap thereof, an oxidation-reduction reaction is brought about. Such a semiconductor is called a photocatalytic semiconductor or merely a photocatalyst.

Photocatalysts are in the form of powder and may be used as suspended in a solution, or may be used as supported on a substrate. From the standpoint of photocatalytic activity, the former is more active owing to the greater surface area. From the standpoint of practical applications, it has been frequently experienced to inevitably adopt the latter rather than the former owing to the ease in handing.

In order to support a photocatalyst on a substrate, there has been adopted a method wherein the particles of a photocatalyst are sintered at high temperatures and supported on the substrate. Another method has been proposed wherein a certain type of fluoropolymer is used as a binder, with which a photocatalyst is supported on a substrate. For instance, Japanese Laid-open Patent Application No. 4-284851 sets out a method wherein a mixture of the particles of a photocatalyst and a fluoropolymer is built up as layers and bonded under compression pressure. Japanese Laid-open Patent Application No. 4-334552 sets forth a method wherein the particles of a photocatalyst are thermally bonded to a fluoropolymer. Moreover, Japanese Laid-open Patent Application No. 7-171408 sets out a method wherein the particles of a photocatalyst is bonded on a substrate through a hard-to-decompose binder including an inorganic binder such as water glass or an organic binder such as a silicone copolymer, and also a method for manufacturing a photocatalytic body which includes, on a substrate, a first layer made of a hard-to-decompose binder, and a second layer formed on the first layer and made of a hard-to-decompose binder and the particles of a photocatalyst. In addition, Japanese Laid-open Patent Application No. 5-309267 describes a method wherein the metal oxide obtained from a metal oxide sol is used to support and fix the powder of a photocatalyst therewith. It is stated that the metal oxide sols are obtained from organometallic compounds such as alkoxides, acetylacetonate, carboxylates of metals as used in a sol-gel method, or are obtained by hydrolysis of an alcohol solution of chlorides, such as titanium tetrachloride, in the presence of an acid or alkali catalyst.

DISCLOSURE OF THE INVENTION

In recent years, attempts have been made to decompose, purify and sterilize harmful substances, offensive odor components and oily components ascribed to daily living environments by use of photocatalysts, thus leading to a quick extension of the application range of photocatalysts. This, in turn, requires a method of causing the particles of a photocatalyst to be firmly supported on all types of substrates over a long time without a sacrifice of its photocatalytic function. Especially, where a titanium oxide sol, which exhibits the good photocatalytic function but is poor in the function of bonding to a substrate, is used as a photocatalyst, it is required to improve the bonding property.

However, in these prior art methods, the bonding strength is not satisfactory, so that few methods ensures the support over a long time. If it is intended to make a photocatalytic body which has an improved bonding strength and ensures the support over a long time, there has arisen the problem that the photocatalytic function lowers. In case where the substrate made of an organic polymer resin is employed and rutile titanium oxide, which is weaker in photocatalytic function than anatase titanium oxide, is used, the photocatalytic reaction proceeds. Not only the organic polymer resin per se undergoes a photochemical reaction, but also the use over a long time results in degradation and decomposition.

Moreover, where organic polymer resins are used as a substrate, preliminary coating such as with a silica sol has been attempted, with the attendant problem that during the course of coagulation drying of the silica sol, cracks or voids are formed, thus presenting a problem on their bonding performance.

In order to solve the above problems, studies have been made on how to firmly support the particles of a photocatalyst on all types of substrates over a long time without impeding its photocatalytic function. As a result, it has been unexpectedly found that when using an amorphous titanium peroxide sol as a binder, the particles of a photocatalyst can be firmly supported on all types of substrates over a long time without impeding the photocatalytic function. The invention has been accomplished based on the finding.

More particularly, the invention relates to a method for manufacturing a photocatalytic body by use of a photocatalyst such as of titanium oxide and an amorphous titanium peroxide sol so that the photocatalyst is fixedly supported on a substrate, and also to a method for manufacturing a photocatalytic body which comprises forming, on a substrate, a first layer of an amorphous titanium peroxide sol having no photocatalytic function, and further forming a second layer on the first layer wherein the second layer is made of a photocatalyst and an amorphous titanium peroxide sol. Further, the invention relates to a photocatalytic body obtained by these methods and to a photocatalyst composition used for the manufacture.

The amorphous titanium peroxide sol used in the practice of the invention may be prepared, for example, by the following manner. An alkali hydroxide such as aqueous ammonia or sodium hydroxide is added to an aqueous solution of a titanium salt such as titanium tetrachloride, $TiCl_4$. The resultant light bluish white, amorphous titanium hydroxide, $Ti(OH)_4$, may be called ortho-titanic acid, $H_4TiO_4$. This titanium hydroxide is washed and separated, after which it is treated with an aqueous hydrogen peroxide solution to obtain an amorphous titanium peroxide solution useful in the present invention. The amorphous titanium peroxide sol has a pH of 6.0~7.0 and a particle size of 8~20 nm, with its appearance being in the form of a yellow transparent liquid. The sol is stable when stored at normal temperatures over a long time. The sol concentration is usually adjusted to a level of 1.40~1.60%. If necessary, the concentration may be optionally controlled. If the sol is used at low concentrations, it is used by dilution such as with distilled water.

The amorphous titanium peroxide sol remains as amorphous and is not crystallized in the form of anatase titanium oxide at normal temperatures. The sol has good adherence, a good film-forming property and is able to form a uniform flat thin film, and a dried film has such a property of being insoluble in water.

It will be noted that when the amorphous titanium peroxide sol is heated to 100° C. or above, it is converted to anatase titanium oxide sol. The amorphous titanium peroxide sol, which has been dried and fixed on a substrate after coating, is converted to anatase titanium oxide when heated to 250° C. or above.

The photocatalysts usable in the present invention include $TiO_2$, ZnO, $SrTiO_3$, CdS, CdO, CaP, InP, $In_2O_3$, CaAs, $BaTiO_3$, $K_2NbO_3$, $Fe_2O_3$, $Ta_2O_5$, $WO_3$, $SaO_2$, $Bi_2O_3$, NiO, $Cu_2O$, SiC, $SiO_2$, $MoS_2$, $MoS_3$, InPb, $RuO_2$, $CeO_2$ and the like. Of these, titanium oxide is preferred. Titanium oxide may be used in the form of particles or powder, or in the form of a sol.

Titanium oxide in the form of a sol, i.e. a titanium oxide sol, can be prepared by heating an amorphous titanium peroxide sol at a temperature of 100° C. or above. The properties of the titanium oxide sol, more or less, change depending on the heating temperature and the heating time. For instance, an anatase titanium oxide sol which is formed by treatment at 100° C. for 6 hours has a pH of 7.5~9.5 and a particle size of 8~20 nm, with its appearance being in the form of a yellow suspension.

The titanium oxide sol is stable when stored at normal temperatures over a long time and may form a precipitate on mixing with an acid or a metal aqueous solution. Moreover, the sol may be impeded in its photocatalytic activity or an acid resistance when Na ions co-exists. The sol concentration is usually adjusted to a level of 2.70~2.90% and may be employed after adjustment of the concentration, if necessary.

A titanium oxide sol is preferably used as a photocatalyst. Commercially available "ST-01" (ISHIHARA SANGYOU KAISHA Ltd) or "ST-31" (ISHIHARA SANGYOU KAISHA Ltd) may also be usable.

In the practice of the invention, the substrate used may be made of inorganic materials such as ceramics, glass and the like, organic materials such as plastics, rubber, wood, paper and the like, and metals such as aluminium, steels and the like. Of these, applications to organic polymer resin materials, such as acrylonitrile resin, vinyl chloride resin, polycarbonate resins, methyl methacrylate resin (acrylic resins), polyester resins, polyurethane resins and the like, show good effects. The substrate is not critical with respect to the size or shape and may be in the form of a honeycomb, fibers, a filter sheet, a bead, a foamed body or combinations thereof. If a substrate which allows transmission of UV light is used, a photocatalytic body may be applied to the inner surface of the substrate. The body may also be applicable to coated articles.

In the present invention, binders which are incapable of being decomposed with a photocatalyst mean those binders incapable of being decomposed with photocatalysts and composed of inorganic binders such as water glass, colloidal silica, cement and the like, and organic binders such as fluoropolymers, silicone polymers and the like, as disclosed in the aforementioned JP-A7-171408.

The composition used to make a photocatalytic body may be prepared according to several methods.

One of such methods includes the use of a uniform suspension of titanium oxide powder in an amorphous titanium peroxide sol. For the uniform suspension, it is advantageous to employ ultrasonic wave after mechanical agitation.

Next, the titanium oxide sol and the amorphous titanium oxide sol are mixed to obtain a mixed sol. The mixing ratio is determined depending on the portion of a product to which a photocatalytic body is applied and the use conditions of an instrument using the body. For the mixing, consideration should be taken to the adherence to a substrate, film-forming properties, corrosion resistance and decorativeness of the photocatalytic body made by use of the mixed sol. The mixing ratio can be properly determined depending on the types of articles to be applied which are broadly classified into the following three groups.

(1) Those articles which one contacts or is highly likely to contact and which need decorativeness from the visual standpoint, e.g. interior tiles, sanitary wares, various types of unit articles, tablewares, exterior materials in buildings, interior automotive trims and the like.

(2) Those articles which one does not contact but requires visual decorativeness, e.g. exterior panels for light fittings, underground passage, tunnel, materials for engineering works, and electrical equipments.

(3) Those articles which one does not usually contact or is able to see and in which the function of decomposing organic matters based on a photocatalytic function or the properties inherent to semiconductive metals are utilized, e.g. built-in members in the inside of water-purifier tanks, various types of sewage treatment equipments, water heaters, bath tubs, air conditioners, the hoods of microwave ovens, and other apparatus.

For Group (1), a photocatalytic body which is obtained, in the form of a film, from a mixed sol wherein the titanium oxide sol is mixed in an amount of 30 wt % or below based on the total of the titanium oxide sol and an amorphous titanium peroxide sol is preferred. It has been found that articles using the body are sufficient for sterilization or decontamination in daily life and also for decomposition of residual odors. Moreover, the film surface is so hard that it is free of any wear such as by sweeping or dusting and also of any deposition of foreign matters, along with the unlikelihood of leaving fingerprints on contact.

With water-purifier tanks which belong to Group (3), for example, high photocatalytic activity is the most important property which is required for the photocatalytic body in order to lower a biological oxygen demand (BOD) in final waste water-treated water. It has been found that a photocatalytic body in the form of a film, which is formed of a mixed sol wherein the titanium oxide sol is mixed in an amount of 70 wt % or above based on the total of the titanium oxide sol and the amorphous titanium peroxide sol, is most suitable for this purpose. This photocatalytic body is poor in decorativeness. Since the articles of this group are ones which do neither come in contact with men nor are fell on the eyes. Moreover, it has also been found that such a problem of deposition of a residue in a slight degree can be solved by periodic removal and cleaning.

For the articles of Group (2), it has been found that a photocatalytic body in the form of a film, which is formed by use of a mixed sol wherein the titanium oxide sol is mixed in an amount of 20~80 wt % based on the total of the titanium oxide sol and an amorphous titanium peroxide sol, is suited. This photocatalytic body exhibits properties intermediate between the former two bodies with respect to the hardness, the adherence of foreign matters, and the photocatalytic activity.

For the coating or spraying, on a substrate, of a titanium oxide sol, an amorphous titanium peroxide sol or a mixed sol, any known procedures may be utilized including, for example, dipping, spraying, coating and the like. Good results of coating are frequently obtained when repeating the coating step plural times.

After coating or spraying as mentioned above, the sol is dried and solidified to obtain a photocatalytic body of the invention. The sol may be baked at approximately 200~400° C. and fixedly set on a substrate. The photocatalytic function of titanium oxide lowers by the action of sodium ions. Accordingly, if an organic polymer resin which is liable to undergo decomposition by means of a photocatalyst is used as a substrate, it is preferred to clean the resin surface with a sodium ion-containing material such as a sodium hydroxide solution to permit a sodium source to be present.

It will be noted that where an amorphous titanium peroxide sol is used as a first layer, the peroxide is converted to the crystals of anatase titanium oxide on heating to 250° C. or above, thereby causing a photocatalytic function to develop. Accordingly, lower temperatures, for example, of 80° C. or below are used for drying and solidification. In this case, sodium ions may be added to the titanium peroxide sol for the reasons set out above.

Prior to shaping, the particles made of a spontaneous UV radiating material or a light storage-type UV radiating material, or particles containing such radiating materials may be mixed with a photocatalyst.

The spontaneous UV radiating material (i.e. a spontaneous light-emitting ceramic) is able to emit light by consumption of its internal energy, and makes use of radioactive disintegration of radium or promethium. The emitted light is within a UV range. In practice, a purified powder of rock containing such a component as mentioned above is set into a massive body, and the particles obtained by pulverization of the massive body into pieces are used.

The light storage-type UV radiating material (a light storage-type light emitting ceramic) is one which takes an external energy therein and emits light while releasing once taken energy. The emitted light is within a UV range. Such a material is commercially available under the designations of "LumiNova" (commercial name of NEMOTO & CO., LTD) and "KEPRUS" (commercial name of Next • I CO., LTD). These are made primarily of strontium aluminate ($SrAl_2O_4$) containing highly pure components such as alumina, strontium carbonate, europium, dysprosium and the like. The maximum point of the absorption spectra is at 360 nm, and the particle size is 20 $\mu$m~50 $\mu$m. Pulverized particles prior to powdering may be used as they are.

It will be noted that if there are some commercially available materials which considerably lower in their performance on absorption of moisture, they may be used after encapsulated in glass or a transparent organic polymer resin such as polycarbonate, or may be used by incorporation in a substrate or by attachment on the surface of a substrate.

When a photocatalytic body is made of a mixture of the particles of a spontaneous light-emitting ceramic or a light storage-type light-emitting ceramic or molded particles obtained by mixing the fine particles of these ceramics (hereinafter referred to as mixed particles) with a photocatalyst, the photocatalytic semiconductor of the photocatalytic body is excited by means of UV light radiated from the spontaneous light-emitting ceramic particles or generated by consumption of the energy accumulated in the particles of the light storage-type light-emitting ceramic. Thus, the photocatalytic function is continued if the UV irradiation against the photocatalytic body is interrupted. Moreover, the particles of the spontaneous light-emitting ceramic or the light storage-type light-emitting ceramic usually emanates green, blue or orange-colored visible light, which may be utilized for decoration or directional sign in the dark.

When the photocatalytic semiconductor is controlled in its composition (by addition of inorganic pigments or metals), or is controlled in thermal treatment during the course of the preparation, it can be possible to change a wavelength (absorption band) of UV light necessary for showing the catalytic function, i.e. an excitation wavelength. For instance, if $CrO_3$ is added to $TiO_2$ in small amounts, the absorption band is shifted toward a side of a longer wavelength. This permits the photocatalytic body to be in coincidence with the emission spectral characteristics of a spontaneous UV radiating material or a light storage-type UV radiating material. Proper choice of a photocatalytic semiconductor in coincidence with a wavelength of UV light to be applied thereto becomes possible.

In contrast, the emission spectral characteristics of a spontaneous UV radiating material or a light storage-type UV radiating material may be brought into coincidence with the excitation wavelength of a photocatalytic semiconductor. For instance, the excitation wavelength of titanium oxide is in the range of 180 nm~400 nm. Light storage-type UV radiating materials responsible for the wavelength have never been commercially available.

Light storage ceramics which are commercially available and permit afterglow over a long time include "Luminova" series of NEMOTO & CO., LTD, with some of the series having an afterglow time exceeding 1000 minutes. The light storage ceramics of the long-time afterglow are prepared by adding alumina to a starting main material such as strontium carbonate or calcium carbonate, further adding europium or dysprosium as an activator, and then adding an element such as of lanthanum, cerium, praseodymium, samarium, cadmium, terbium, holmium, erbium, thulium, ytterbium, ruthenium, manganese, tin and bismuth and boric acid as a flux, followed by thermal treatment at 1300° C. The product obtained by this mixing procedure is a blue light emitter having a peak of the shortest wavelength of 440 nm.

In order to shift the emission wavelength to 400 nm or below which corresponds to the excitation wavelength of titanium oxide, additive metal elements may be added for causing the absorption wavelength of the "Luminova" with a peak at 360 nm and the emission wavelength with a peak at 440 nm to come close to each other. Alternatively, if an emission wavelength of 440 nm or below does not generate on the emission of blue light at approximately 450 nm which is a phosphorescent wavelength characteristic inherent to minerals such as strontium, potassim and borax, a mineral element, which does not emanate any phosphorescent color, is shorter in wavelength than strontium, and has an emission wavelength of 400 nm or below without development of any color, may be purified and formulated to develop a light storage-type UV radiating material.

The photocatalytic semiconductor may be preliminarily supported on only the surfaces of unit particles, or may be supported on the entire surface of a molding after mixing of unit particles with the particles of a spontaneous light emitting ceramic or a light storage ceramic or the mixed particles and molding the mixture. In the former case, little photocatalytic semiconductor is deposited on the surfaces of the particles of a spontaneous light emitting ceramic or a light storage ceramic or the mixed particles, so that the quantity of UV light radiated from these particles becomes greater. With the particles of the light storage-type ceramic particles, UV light from outside can be efficiently absorbed.

The photocatalytic body may be admixed with photocatalytic function-assisting additive metals (Pt, Ag, Rh, RuO, Nb, Cu, Sn, NiO and the like) during the course of its preparation. These additives are well known as facilitating the photocatalytic reaction.

BEST MODE FOR CARRYING OUT THE INVENTION

The invention is more particularly described by way of References and Examples, which should not be construed as limiting the scope of the invention hereto.

Reference 1 (Preparation of an Amorphous Titanium Peroxide Sol)

A 1:70 dilution of a 50% solution of titanium tetrachloride, $TiCl_4$, (SUMITOMO SITX CO.) with distilled water and a 1:10 dilution of a 25% solution of ammonium hydroxide, $NH_4OH$, (TAKASUGI PURECHEMICAL INDUSTRY Ltd) with distilled water are mixed at a ratio by volume of 7:1 for neutralization reaction. After completion of the neutralization reaction, the pH is adjusted to 6.5~6.8 and the mixture was allowed to stand for a while, followed by discarding the supernatant liquid. Distilled water is added to the resultant $Ti(OH)_4$ in an amount of about 4 times the gel, followed by sufficient agitation and allowing to stand. While checking with silver nitrate, washing is repeated until no chlorine ion was detected in the supernatant liquid. Finally, the supernatant liquid is discarded to leave a gel alone. In some case, the gel may be subjected to centrifugal dehydration. 210 ml of an aqueous 35% hydrogen peroxide solution is divided into halves and added to 3600 ml of light yellowish white $Ti(OH)_4$ in every 30 minutes, followed by agitation at about 5° C. overnight to obtain about 2500 ml of a yellow transparent amorphous titanium peroxide sol.

If the generation of heat is not suppressed in the above steps, there is the possibility that water-insoluble matters such as metatitanic acid deposits. Thus, it is preferred to carry out all the steps while suppressing the generation of heat.

Reference 2 (Preparation of Titanium Oxide Sol from Amorphous Titanium Peroxide Sol)

When the amorphous titanium peroxide sol is heated at 100° C., it is converted to anatase titanium oxide after passage of about 3 hours and is converted to an anatase titanium oxide sol on heating for about 6 hours. Moreover, when the sol is heated at 100° C. for 8 hours, it assumes light yellow, lightly suspended fluorescence. On concentration, a yellow opaque matter is obtained. Further, when the sol is heated at 100° C. for 16 hours, a very light yellow matter is obtained. These matters, more or less, lowers in dry adherence on comparison with that obtained by heating at 100° C. for 6 hours.

The titanium oxide sol is lower in viscosity than amorphous titanium oxide and is employed after concentration to 2.5 wt % because of the ease in dipping.

EXAMPLE 1

The decomposition test of organic substances using different mixing ratios between the amorphous titanium peroxide sol and the titanium oxide sol was conducted in the following manner. A 150 mm long×220 wide×4 mm thick KERAMIT decorative sheet (Clay Burn Ceramics CO., Ltd) was used as a substrate. Mixed sols having different mixing ratios were each coated onto the substrate in a thickness of about 2 μm according to spraying and dried from normal temperatures to 70° C., followed by baking at about 400° C. for 30 minutes to obtain five types of photocatalytic bodies wherein different types of photocatalysts were each supported on the substrate. These test photocatalytic bodies were each placed in a test container, into which a colored solution of an organic substance to be decomposed was charged to a depth of 1 cm. This colored solution was a 1:30 dilution of POLLUX Red OM-R (SUMIKA COLOR CO., LTD.) which was an aqueous dispersion (red liquid) of Monoazo Red. Next, in order to prevent the evaporation of the colored solution in the container, the container was covered with a float glass (capable of cutting a wavelength of 300 nm or below). Two UV radiators (each being a 20 W blue color fluorescent tube were set at 5 cm above the test container and at 9.5 cm from the substrate while keeping apart from each other at a distance of 13 cm. The individual photocatalytic bodies were irradiated, under which at the time when the color of the colored solution was bleached, the decomposition of the organic matter was judged as completed. The results are described below.

The body wherein 100% titanium oxide sol was applied onto the substrate as able to bleach the color in 72 hours from commencement of the test. Thus, he capability of decomposing the organic substance, the photocatalytic function as good, but a residue after the decomposition was great in amount. On the other hand, with the body using 100% of the amorphous titanium peroxide sol, the color was bleached in 150 hours, so that the capability of decomposing the organic substance, i.e. the photocatalytic function, was poorer than that using 100% of the titanium oxide sol. Nevertheless, the adherence, film-forming property, corrosion resistance and decorativeness were better. The color was bleached in 78 hours for a mixing ratio between the amorphous titanium peroxide sol and the titanium oxide sol at a mixing ratio of 1:3, in 102 hours for a mixing ratio of 1:1, and in 120 hours for a mixing ratio of 3:1, respectively. From the above text, it was confirmed that the photocatalytic function was in reverse proportion to the adherence, film-forming property, corrosion resistance and decorativeness. Thus, it was found that according to the invention, when the mixing ratio was changed, a diversity of applications (portions of articles to be applied and use conditions) were ensured

EXAMPLE 2

An acrylic resin plate and a methacrylic acid resin plate were each provided as a substrate. These resin plates were, respectively, immersed in a 2% sodium hydroxide solution at 80° C. for 30 minutes, washed with water and dried. The titanium peroxide sol prepared in Reference 1, to which 0.5% of a surface active agent was added, was coated by. repeating dipping 3~4 times to form a first layer. Drying was effected at 70° C. for 10 minutes.

A second layer was formed by coating five mixtures of the amorphous titanium peroxide sol and the titanium oxide sol at such mixing rations as in Example 1 by repeating dipping 3~4 times. Drying solidification was effected under conditions of 120° C. and 3 minutes for the acrylic resin plate and was stopped for the methacrylic resin plate when the temperature of a dryer reached 119° C. The results of the photocatalytic function were similar to those of Example 1. With regard to the adhesion force on the resin plates and the unlikelihood of decomposing the resin plates with the photocatalyst, the bodies having the first layer were much more excellent.

EXAMPLE 3

A highly water-absorbing commercially available tile was used as a substrate. The tile was washed with a neutral detergent, dried and applied with a surface active agent. A photocatalyst composition used was one which was obtained by adding 1 part, on the weight basis, of titanium oxide powder "ST-01" (ISHIHARA SANGYO KAISHA Ltd) to 50 parts of the titanium peroxide sol (pH 6.4) prepared in Reference 1, mechanically agitating for about 15 minutes and further agitating by means of ultrasonic waves in order not to leave flocs. Dipping was effected at a rate of 0.3~0.5 cm/second, followed by drying overnight at 30° C. This was baked at 400° C. for 30 minutes to make a photocatalytic body.

The photocatalyst layer was firmly bonded to the tile surface over a long time.

On the other hand, when the tile was coated with a dispersion of the titanium oxide powder in distilled water, good bonding was not attained.

EXAMPLE 4

A float glass which had been degreased and treated with a surface active agent was coated on the surface thereof with a glass beads suspension by means of a spray gun several times. After drying at 40° C., the coating was baked at 700° C. for 30 minutes. The float glass on which the glass beads was fixed was further coated with a photocatalyst composition used in Example 3, dried and baked at 400° C. for 30 minutes to obtain a photocatalytic body. This photocatalytic body was strongly bonded to the glass beads fixed on the float glass over a long time.

EXAMPLE 5

A light storage-type UV radiating material "KEPRUS" (commercial name of Next•I CO., LTD) was mixed with an amorphous titanium peroxide sol in an amount of 25 wt % based on the titanium peroxide in the sol, agitated, sprayed over a KERAMIT decorative sheet used as a substrate, dried at normal temperature, baked at 400° C. for 30 minutes, and cooled. Thereafter, a titanium oxide sol whose excitation wavelength was adjusted to an emission wavelength of the radiating material was sprayed in a thickness of 1 $\mu$m, dried and baked at 40° C. for 30 minutes. The resultant photocatalytic body had the photocatalytic action continued by means of the UV light emanated from the UV radiating material when irradiation of the UV light against the body was interrupted.

INDUSTRIAL APPLICABILITY

According to the invention, a photocatalyst can be supported and fixed on a substrate without lowering the photocatalytic function of the photocatalyst thereby providing a photocatalytic body which is usable over a long time. The photocatalytic body of the invention can be used as interior and exterior members for buildings such as interior and exterior tiles, sanitary wares, air conditioners, bathtubs and the like, exterior panels of various types of electric equipments such as lightning fittings, interior automotive members, inner walls of underground passage and tunnel, water-purifier tanks and the like.

What is claimed is:

1. An anatase titanium oxide sol having pH of 7.5–9.5 and a particle size of 8–20 nm and comprised of a yellow suspension, made by a process comprising:

adding aqueous ammonia or sodium hydroxide to a titanium salt solution;

washing and separating a resulting titanium hydroxide;

treating a resulting light bluish white titanium hydroxide with an aqueous hydrogen peroxide solution; and heating a resulting amorphous titanium peroxide sol having a pH of 6.0–7.0 and a particle size of 8–20 nm, which is yellow and transparent, to a temperature of 100° C. or higher.

* * * * *